US008604646B2

(12) United States Patent
Chen et al.

(10) Patent No.: US 8,604,646 B2
(45) Date of Patent: Dec. 10, 2013

(54) POWER MANAGEMENT INTEGRATED CIRCUIT AND POWER MANAGEMENT METHOD

(75) Inventors: Chi-Pin Chen, Hsin-Chu (TW);
Ming-Ying Kuo, Hsin-Chu (TW);
Chun-Teh Chen, Hsin-Chu (TW)

(73) Assignee: Leadtrend Technology Corp., Science-Base Industrial Park, Hsin-Chu (TW)

( * ) Notice: Subject to any disclaimer, the term of this patent is extended or adjusted under 35 U.S.C. 154(b) by 564 days.

(21) Appl. No.: 12/861,810

(22) Filed: Aug. 23, 2010

(65) Prior Publication Data

US 2011/0057520 A1 Mar. 10, 2011

(30) Foreign Application Priority Data

Sep. 4, 2009 (TW) ................................ 98129824 A

(51) Int. Cl.
*H02J 7/00* (2006.01)
(52) U.S. Cl.
USPC ...................... 307/125; 323/21.07; 323/21.08; 323/21.15; 323/97; 323/131
(58) Field of Classification Search
USPC ........................................................ 307/125
See application file for complete search history.

(56) References Cited

U.S. PATENT DOCUMENTS 7,242,153 B2   7/2007  Yu
2009/0147547 A1*  6/2009  Yamashita ................ 363/21.16

FOREIGN PATENT DOCUMENTS

TW   200616319   5/2006
TW   200803142   1/2008
TW   200917638   4/2009

* cited by examiner

*Primary Examiner* — Rexford Barnie
*Assistant Examiner* — Toan Vu
(74) *Attorney, Agent, or Firm* — Winston Hsu; Scott Margo

(57) ABSTRACT

The power management integrated circuit has a startup circuit, a switch controller and a standby controller. Powered by a power source, the startup circuit provides electric power to an operational power source during a startup period. The switch controller controls a power switch to store or release energy in an energy conversion unit. Powered by the power source, the standby controller receives a standby signal. When the standby signal is asserted, the standby controller disables the startup circuit and the switch controller, thereby startup circuit not providing electric power to the operational power source and the switch controller continuously turning off the power switch.

5 Claims, 4 Drawing Sheets

POWER MANAGEMENT INTEGRATED CIRCUIT AND POWER MANAGEMENT METHOD

BACKGROUND OF THE INVENTION

1. Field of the Invention

The present invention is related to the power management device and control method thereof in electronic devices.

2. Description of the Prior Art

As technology advances, the awareness of environmental protection arises such that designing electronic devices with minimizing power consumption and carbon dissipation has become a widespread trend. More particularly, more and more regulations have been legislated to regulate the power saving standard for electronic devices. For instances, Energy Star is a standard set to regulate the power consumption of the electronic devices. Therefore, designing electronic devices with effective power saving function is always an objective to be pursuit on.

FIG. 1 is a diagram illustrating a conventional power converting system. Alternating Current (AC) input 20 is coupled to a commercial power source such as the AC power source of 110 volt (V) or 220V. Power source board 30 converts the commercial power source $V_{AC}$ to an output power source $V_{OUT}$ with appropriate voltage level, to be provided to mother board 40 of a computer. To enhance the power-saving function, mother board 40 transmits source standby signal $S_{SDO}$ to shut down power board 30 when mother board 40 determines output power source $V_{OUT}$ supplied by power source board 30 is not required (for example, when mother board 40 is not turned on or in a standby state). The power converting system disclosed in FIG. 1 is not only limited to computers but also applicable to other electronic devices such as LCD monitors.

However, methods to shut down power source board 30 are different, depending on system requirements.

DETAILED DESCRIPTION

Further objects of the present invention and more practical merits obtained by the present invention will become more apparent from the description of the embodiments which will be given below with reference to the accompanying drawings. For explanation purposes, components with equivalent or similar functionalities are represented by the same symbols. Hence components of different embodiments with the same symbol are not necessarily identical. Here, it is to be noted that the present invention is not limited thereto.

Figure 1:
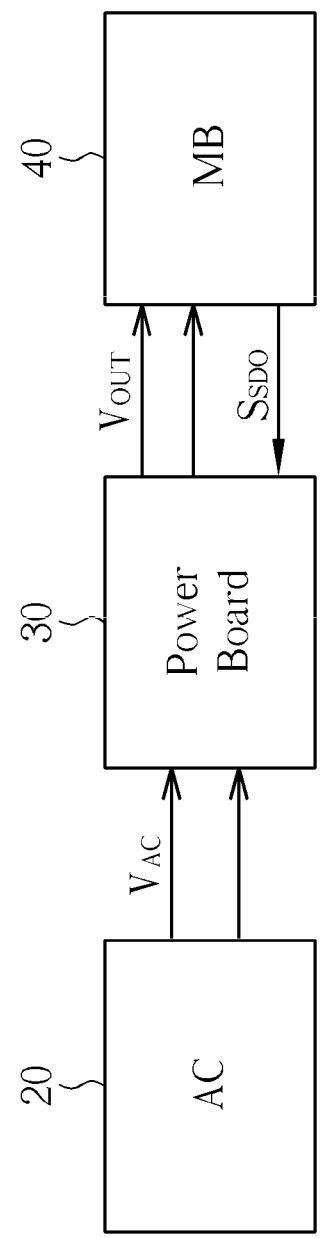
FIG. 1 is a diagram illustrating a conventional power converting system.
Figure 2:
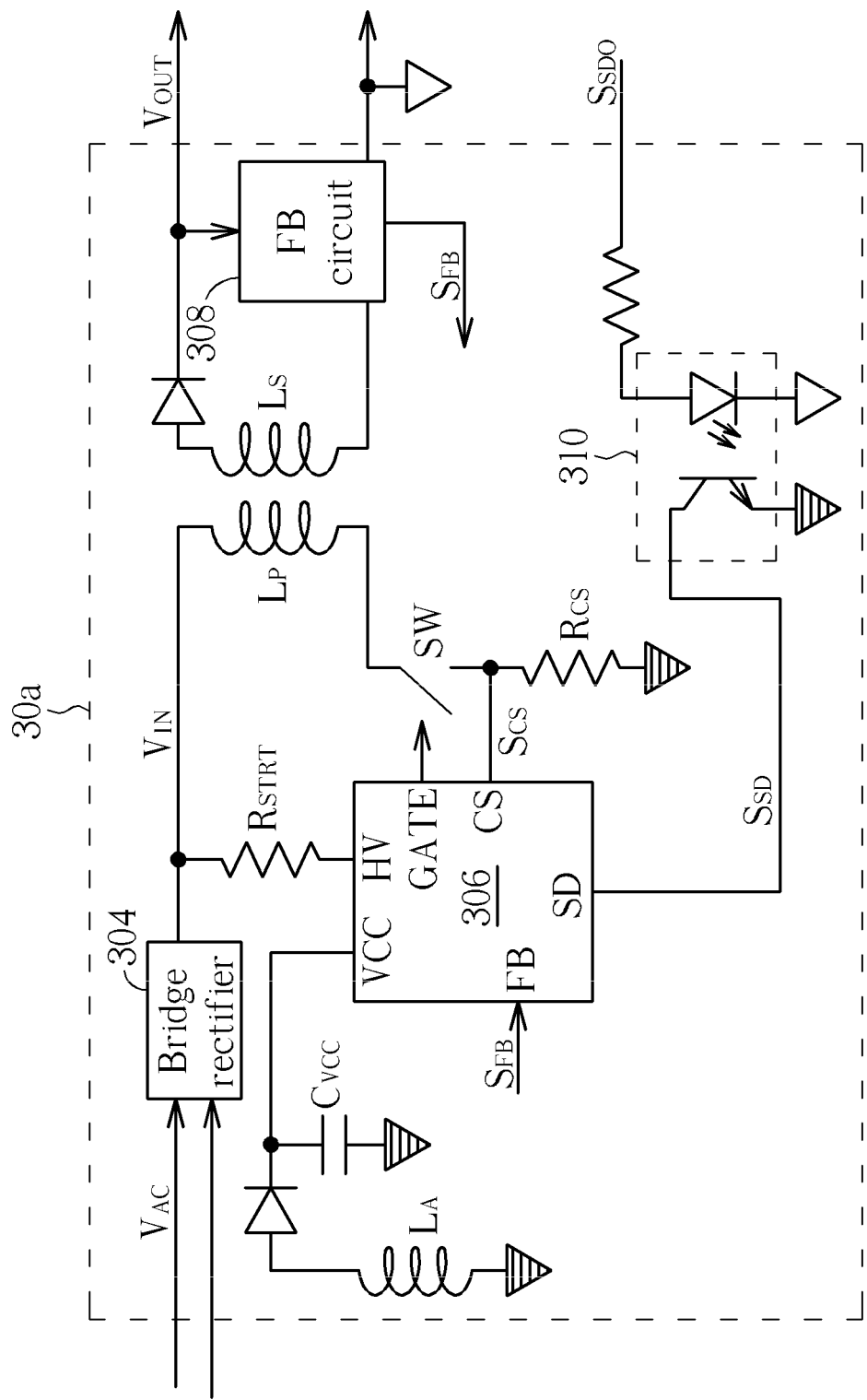
FIG. 2 is a diagram illustrating one embodiment of power source board of the present invention.

FIG. 2 is a diagram illustrating one embodiment of power source board 30a of the present invention. Power source board 30a comprises a flyback power source converter used for converting the electrical energy received from AC power source $V_{AC}$ to output power source $V_{OUT}$ with desired specification. Bridge rectifier 304 roughly rectifies AC power source $V_{AC}$ to generate rectified high-voltage power source $V_{IN}$. Power switch SW is coupled to gate terminal GATE of power management integrated circuit (IC) 306 to control the current of primary winding $L_P$ of the transformer. When power switch SW is turned on, the electrical energy stored in the transformer increases; when the power switch SW is turned off, the electrical energy stored in the transformer is released via secondary winding $L_S$ and auxiliary winding $L_A$. The electrical energy released by secondary winding $L_S$ is transmitted via the rectifier to be stored in an output capacitor so as to generate output power source $V_{OUT}$. The electrical energy output by auxiliary winding $L_A$ is transmitted to power source terminal VCC of power management IC 306 to supply the operational power source $V_{CC}$ required by power management IC 306.

Feedback circuit 308 monitors the amplitude (i.e. the amplitude may be current, voltage, or power) of output power source $V_{OUT}$ and provides feedback signal $S_{FB}$ to feedback terminal FB of power management IC 306. High-voltage terminal HV of power management IC 306 is coupled to rectified high power source $V_{IN}$ via start resistor $R_{STRT}$. The peak voltage of rectified high power source $V_{IN}$ may be ranged from 90 to 700 volts. Here in this specification, a "High-voltage" represents a voltage equal to or higher than 90 volt. Current detecting terminal CS of power management IC 306 is utilized to detect the current flowing through power switch SW by detecting voltage $V_{CS}$ across detection resistor $R_{CS}$. Photo coupler 310 is coupled to standby control terminal SD. When standby signal $S_{SDO}$ is at a logic high level, standby signal $S_{SD}$ is at a logic low level, deemed to be "deasserted". Consequently power management IC 306 operates normally to turn on/off power switch SW to generate output power source $V_{OUT}$. When standby signal $S_{SDO}$ is at a logic low level, standby signal $S_{SD}$ is at a logic high level, deemed to be "asserted". Consequently power management IC 306 enters standby state (OFF mode), turning and keeping off power switch SW.

Taking standby signal $S_{SD}$ at a logic high level as to be deasserted may have the following advantage. When power source board 30 is not coupled to the load, i.e. mother board 40 is not coupled to power source board 30, standby signal $S_{SDO}$ is at a logic low level, and standby signal $S_{SD}$ is at a logic high level. Accordingly, power source board 30 enters standby state directly, which reduces power consumption.

Figure 3:
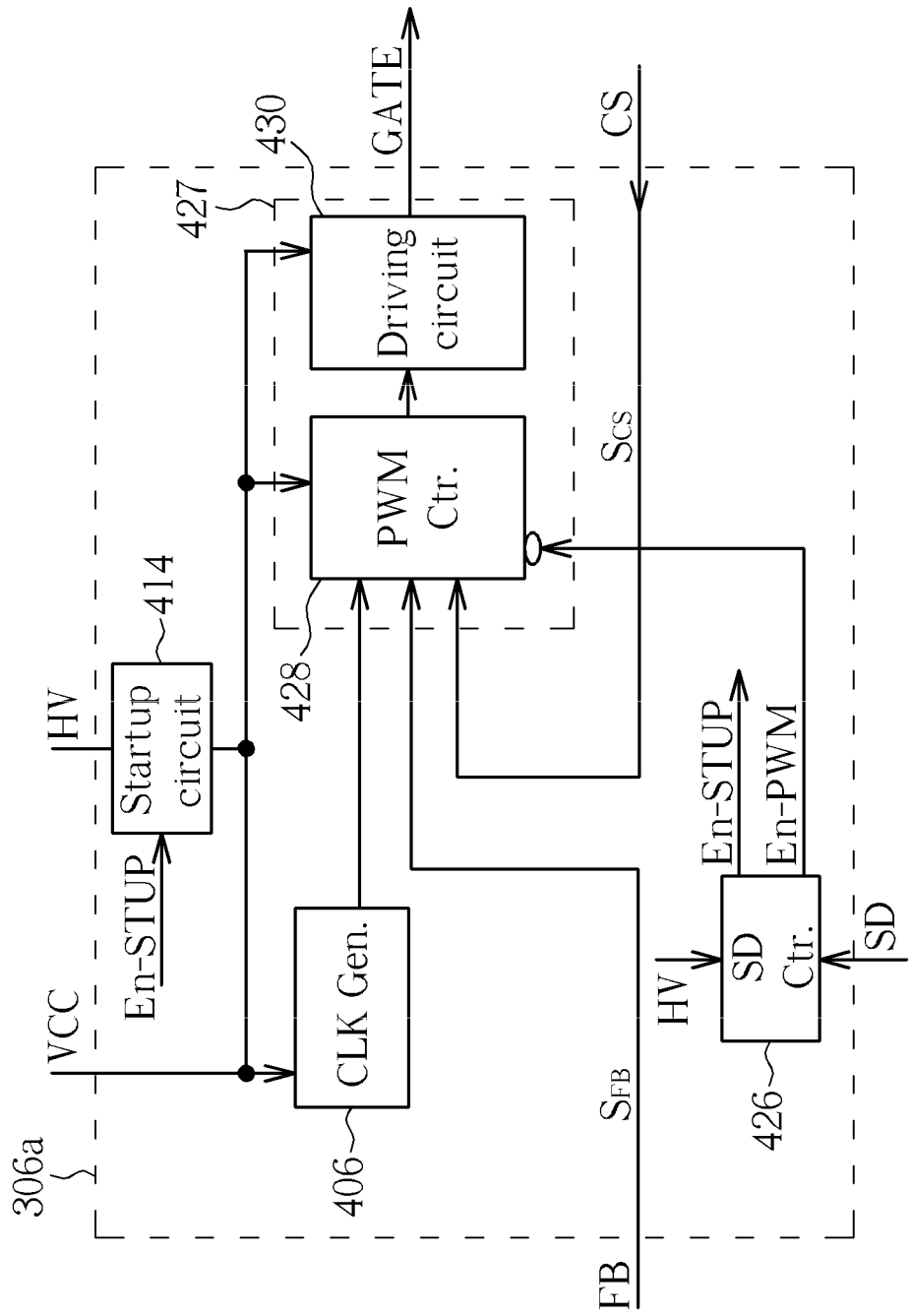
FIG. 3 is a diagram illustrating an embodiment of power management IC of FIG. 2.

FIG. 3 is a diagram illustrating an embodiment of power management IC 306 of FIG. 2. As illustrated in FIG. 3, power management IC 306a has a high-voltage startup function, realized by startup circuit 414. Startup circuit 414 receives a rectified voltage signal of rectified high power source $V_{IN}$ from high-voltage terminal HV. Within a startup period, prior the voltage of operational power source $V_{CC}$ has reached a predetermined voltage level (for instances, 20V), startup circuit 414 supplies a current to charge filter capacitor $C_{VCC}$ via power source terminal VCC to generate operational power source $V_{CC}$. Switch controller 427 and clock generator 406 may start to operate after the voltage of operational power source $V_{CC}$ is higher than the predetermined voltage level.

Switch controller 427 comprises Pulse width modulator (PWM) controller 428 and driving circuit 430. PWM controller 428 controls driving circuit 430 according to feedback signal $S_{FB}$ from feedback terminal FB, current detecting signal $S_{CS}$ from current detecting terminal CS, and the clock signal from clock generator 406. Driving circuit 430 controls power switch SW in FIG. 2 via gate terminal GATE so as to control the electric energy of the transformer to be increased or released.

In FIG. 3, PWM controller 428 controls the duty cycle of power switch according to the constant frequency of the clock signal provided by clock generator 406. In yet another embodiment, the PWM controller may fix the on time (constant ON time) but vary the off time or clock frequency of power switch SW. In yet another embodiment, the PWM controller may fix the off time (constant OFF time) but vary the on time or clock frequency of power switch SW.

Standby controller 426 is coupled to high-voltage terminal HV and powered by rectified high-voltage power source $V_{IN}$. Through standby control terminal SD, standby controller 426 determines whether standby signal $S_{SD}$ is asserted or deasserted. In the embodiments of FIG. 2 and FIG. 3, when standby controller 426 determines standby signal $S_{SD}$ is asserted, standby controller 426 makes startup circuit 414 and PWM controller 428 disabled through signals EN-STUP and En-PWM respectively. In a disabled state, PWM controller 428 keeps driving circuit 430 turning off power switch SW; startup circuit 414 does not provide charge current for generating operational power source $V_{CC}$ no matter the voltage of operational power source $V_{CC}$ is. Therefore, in the disabled state, the voltage of operational power source $V_{CC}$ possibly gradually decreases because switch controller 427 and clock generator 406 may still consume some electrical energy but operational power source $V_{CC}$ cannot be supplied from startup circuit 414 or auxiliary winding $L_A$. If the voltage of operational power source $V_{CC}$ is lower than a certain level, switch controller 427 and clock generator 406 even possibly stop operating, while power switch is still turned off.

In one embodiment, when standby controller 426 determines that standby signal $S_{SD}$ is asserted, standby controller 426 disables not only startup circuit 414 and PWM controller 428 but also clock generator 406, which is stopped from outputting the clock signal. Moreover, when standby signal $S_{SD}$ is asserted, driving circuit 430 can also be optionally disabled such that power switch SW is turned off continuously.

It is worth of mentioning that the said disabled state of a device indicates that the output of the device is kept on a fixed digital logic level, and/or that the direct current in the device is substantially stopped. For example, when in the disabled state, clock generator 406 stays outputting the clock signal on logic level "0", and, optionally, stops from being powered by a power source.

When standby controller 426 determines standby signal $S_{SD}$ is deasserted, both of startup circuit 414 and switch controller 427 are enabled, and switch controller 427 and clock generator 406 may start to operate normally for controlling power switch SW, depending on the voltage of operational power source $V_{CC}$.

Figures 4A, 4B:
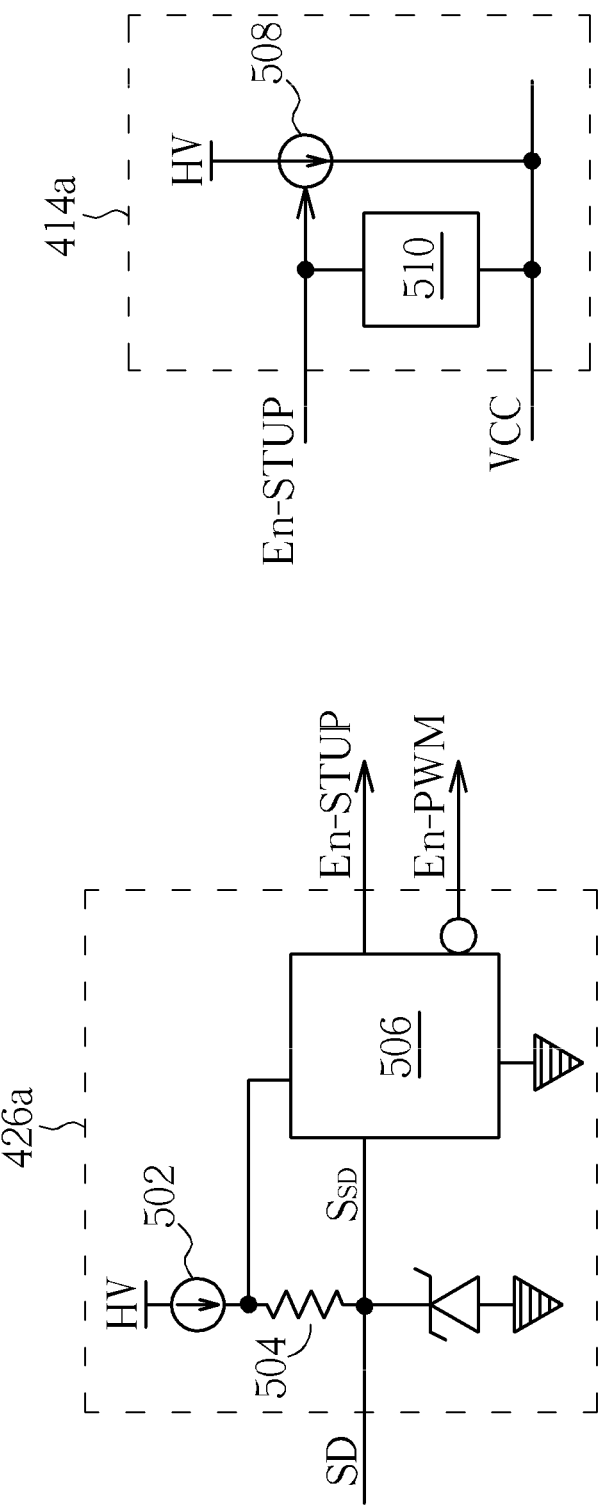
FIG. 4A is a diagram illustrating one embodiment of standby controller in FIG. 3.
FIG. 4B is a diagram illustrating one embodiment of startup circuit in FIG. 3.

FIG. 4A is a diagram illustrating one embodiment of standby controller 426 in FIG. 3. Standby controller 426a is coupled to high-voltage terminal HV, powered by rectified high-voltage power source $V_{IN}$. Current source 502 provides power required by logic determining device 506 and resistor 504. A zener diode is coupled between resistor 504 and ground line GND for clamping the highest voltage level of standby signal $S_{SD}$. Standby terminal SD is coupled to resistor 504 for making the default voltage of standby signal $S_{SD}$ to be the high voltage logic level. Logic determining device 506 generates signals En-STUP and En-PWM according to standby signal $S_{SD}$ from standby terminal SD. For example, when standby signal $S_{SD}$ is asserted (logic high level), both signals En-STUP and En-PWM are deasserted; when standby signal $S_{SD}$ is deasserted (logic low level), both signals En-STUP and En-PWM are asserted.

FIG. 4B is a diagram illustrating one embodiment of startup circuit 414 in FIG. 3. Startup circuit 414a comprises a controllable current source 508 coupled between high-voltage terminal HV and power source terminal VCC. Signal En-STUP is transmitted to the control terminal of controllable current source 508. When signal En-STUP is asserted, controllable current source 508 provides charge current to power source terminal VCC. Deasserted signal En-STUP disables controllable current source 508, such that substantially no current or power is drained from high-voltage terminal HV to supply operational power source $V_{CC}$. Voltage detector 510 is coupled between power source terminal VCC and the control terminal of controllable current source 508. If the voltage on power source terminal VCC is approximately higher than a first predetermined value, voltage detector 510 may turn off controllable current source 508 to stop charging power source terminal VCC; if the voltage on power source terminal VCC is approximately lower than a second predetermined value, which is not higher than the first one, voltage detector 510 may turn on controllable current source 508 to start charging power source terminal VCC.

Please refer to FIGS. 2-4A and 4B. When power source board 30a is only coupled to AC power source $V_{AC}$ but not coupled to any mother board, standby signal $S_{SDO}$ is at a logic low level and standby signal $S_{SD}$ is at a logic high level, so startup circuit 414 is turned off. Without current supplied from auxiliary winding or high-voltage terminal HV, the voltage of operational power source $V_{CC}$ is kept at a low-voltage level, and therefore PWM controller 428 and driving circuit 430 cannot operate to turn on power switch SW. Power management IC 306a enters the standby state, which means only standby controller 426 consumes a very little current and other parts of power management IC 306a can be deemed as consuming no power. Therefore, the overall power consumed by power management IC 306a, in the standby state, will be very little.

When power source board 30a is coupled to AC power source $V_{AC}$ and the mother board, and the mother board requires power, standby signal $S_{SDO}$ will be deasserted, being raised to the logic high level, and causing standby signal $S_{SD}$ at the logic low level. Thus, startup circuit 414 starts to charge operational power source $V_{CC}$. When the voltage of operational power source $V_{CC}$ reaches a certain high level, PWM controller 428 and driving circuit 430 start turning on/off power switch SW and meanwhile supply power to operational power source $V_{CC}$ and output power source $V_{OUT}$. Furthermore, voltage detector 510 turns off startup circuit 414 timely so that operational power source $V_{CC}$ is solely supplied by auxiliary winding $L_A$.

When power source board 30a is coupled to AC power source $V_{AC}$ and the mother board, but the mother board requires no power, standby signal $S_{SDO}$ is then asserted, being at a logic low level and causing standby signal $S_{SD}$ at a logic high level. Consequently, startup circuit 414 is turned off, and driving circuit 430 is forced to keep turning off power switch SW. Thus, power management IC 306a enters the standby state, consuming very little power.

Those skilled in the art will readily observe that numerous modifications and alterations of the device and method may be made while retaining the teachings of the invention.

What is claimed is:
1. A power management Integrated Chip (IC), comprising:
a startup circuit, powered by a power source, for supplying an operational power source within a startup period, wherein the startup circuit comprises:

a controllable current source, coupled between the power source and the operational power source, having a control terminal; and a voltage detector, coupled to the control terminal and the operational power source, for turning off the controllable current source when voltage of the operational power source is higher than a predetermined value;

a switch controller for controlling a power switch to increase or release energy in an energy conversion unit, wherein the switch controller comprises:

a driving circuit for driving the power switch; and a Pulse Width Modulation (PWM) controller for controlling on time of the power switch; and a standby controller, powered by the power source, for receiving a standby signal, wherein when the standby signal is asserted, the standby controller fixes an output of the PWM controller, making the driving circuit turn off the power switch;

wherein when the standby signal is asserted, the standby controller disables the startup circuit and the switch controller, making the startup circuit substantially supply no power to the operational power source and the switch controller turn off the power switch.

2. The power management IC of claim 1, wherein when the standby signal is at a logic high level, the standby signal is asserted.

3. The power management IC of claim 1, further comprising:

a clock generator for generating a clock signal to the PWM controller.

4. A power management method comprising:

providing a power management IC, coupled to a power source, for controlling an energy conversion unit to increase or release energy by turning on and turning off a power switch, the power management IC having a startup function;

receiving a standby signal;

disabling the startup function and turning off the power switch when the standby signal is asserted;

enabling the startup function and controlling the power switch to make the energy conversion unit increase or release energy when the standby signal is deasserted;

detecting the voltage of an operational power source;

enabling the startup function when the voltage of the operational power source is approximately lower than a first predetermined value; and disabling the startup function when the voltage of the operational power source is approximately higher than a second predetermined value not lower than the first predetermined value.

5. The power management method of claim 4, wherein when the standby signal is at a logic high level, the standby signal is asserted; when the standby signal is at a logic low level, the standby signal is deasserted.

* * * * *